(12) United States Patent
Schodel et al.

(10) Patent No.: US 8,940,262 B2
(45) Date of Patent: Jan. 27, 2015

(54) PROCESS AND PLANT FOR THE REMOVAL OF NITROGEN OXIDES FROM OXYGEN-CONTAINING GAS STREAMS

(75) Inventors: Nicole Schodel, Munich (DE); Hans-Jorg Zander, Munich (DE); Florian Winkler, Munich (DE); Roland Ritter, Dresden (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/110,718

(22) PCT Filed: Apr. 12, 2012

(86) PCT No.: PCT/EP2012/001592
§ 371 (c)(1),
(2), (4) Date: Nov. 13, 2013

(87) PCT Pub. No.: WO2012/139763
PCT Pub. Date: Oct. 18, 2012

(65) Prior Publication Data
US 2014/0086813 A1    Mar. 27, 2014

(30) Foreign Application Priority Data
Apr. 14, 2011   (DE) .......................... 10 2011 017 032

(51) Int. Cl.
*B01D 53/56* (2006.01)
*B01D 53/74* (2006.01)
(Continued)

(52) U.S. Cl.
CPC ................ *B01D 53/56* (2013.01); *B01D 53/78* (2013.01); *B01D 53/96* (2013.01); *F01N 3/0814* (2013.01); *B01D 2251/2062* (2013.01); *B01D 2257/404* (2013.01)

USPC ........ 423/239.1; 422/168; 422/187; 422/600; 422/611

(58) Field of Classification Search
USPC ................ 423/239.1; 422/168, 187, 600, 611
See application file for complete search history.

(56) References Cited

U.S. PATENT DOCUMENTS

| 4,219,536 A | 8/1980 | Hoenke |
| 2007/0122328 A1 | 5/2007 | Allam |

(Continued)

FOREIGN PATENT DOCUMENTS

| DE | 4335867 A1 | 5/1995 |
| DE | 102008062496 A1 | 6/2010 |

(Continued)

OTHER PUBLICATIONS

International Search Report from PCT/EP2012/001592 dated Jul. 24, 2012.

(Continued)

*Primary Examiner* — Timothy Vanoy
(74) *Attorney, Agent, or Firm* — Millen, White, Zelano & Branigan, P.C.

(57) ABSTRACT

The invention relates to a process for the removal of NO and $NO_2$ from an oxygen-containing gas stream, which comprises a scrubbing step in which the gas stream is brought into contact with an ammonia-containing scrubbing solution, NO is oxidized to form $NO_2$ by means of the oxygen present at a pressure of at least 2 bar and temperatures of from 15° C. to 60° C. and at least part of the $NO_2$ present in the gas stream is converted by means of the ammonia-containing scrubbing solution into ammonium nitrite and a downstream decomposition step in which the ammonium nitrite present in the scrubbing solution is thermally decomposed into elemental nitrogen and water, where the decomposition step is carried out at temperatures of from 121° C. to 190° C. and a pressure of from 2 to 40 bar. The invention likewise relates to a plant for operation of the process of the invention.

21 Claims, 5 Drawing Sheets

(51) Int. Cl.
*B01D 53/78* (2006.01)
*B01D 53/96* (2006.01)
*F01N 3/08* (2006.01)

(56) References Cited

U.S. PATENT DOCUMENTS

| | | |
|---|---|---|
| 2007/0178035 A1 | 8/2007 | White |
| 2008/0226515 A1 | 9/2008 | Allam |
| 2009/0260585 A1 | 10/2009 | Hack |
| 2011/0300046 A1* | 12/2011 | Schodel et al. ............... 423/235 |
| 2013/0259786 A1* | 10/2013 | Boos et al. .................... 423/235 |

FOREIGN PATENT DOCUMENTS

| | | |
|---|---|---|
| EP | 351613 | 7/1989 |
| EP | 0351613 A2 | 1/1990 |
| EP | 1790614 | 5/2007 |
| RU | 2069173 | 9/1993 |
| WO | 9422562 A1 | 10/1994 |

OTHER PUBLICATIONS

English Abstract of Invention of RU Publication No. 2069173. Publication Date: Nov. 20, 1996. RU Application No. 93045491/26. Filing Date: Sep. 7, 1993. (1 page).

\* cited by examiner

PROCESS AND PLANT FOR THE REMOVAL OF NITROGEN OXIDES FROM OXYGEN-CONTAINING GAS STREAMS

The present invention relates to a process and a plant for the removal of nitrogen oxides from combustion offgases according to the preambles of the independent claims.

The combustion of carbon-containing energy carriers forms flue gases which contain not only carbon dioxide but also, inter alia, nitrogen oxides. These nitrogen oxide compounds have to be at least partly removed before the flue gases are returned to the environment.

Selective catalytic and noncatalytic reduction processes are predominantly used for nitrogen oxide removal in industrial practice. An example of a catalytic reduction process is the reduction of the nitrogen oxides over vanadium-titanium oxide catalysts by means of ammonia or urea as reducing agent.

As an alternative, nitrogen oxides can also be removed from a gas mixture by oxidation and subsequent scrubbing. In the Walter process, nitrogen oxides are oxidized by means of ozone and the resulting nitrogen dioxide is scrubbed out as nitrite and nitrate by means of an ammonia-containing scrubbing solution.

An improvement of the Walter process is described in DE 10 2008 062 496. As a result of the increased pressure in the ammonia scrub, the nitrogen oxides are oxidized by the oxygen present in the flue gas, so that the use of ozone can be dispensed with. Here, the oxidation of the nitrogen oxides proceeds spontaneously due to the increased partial pressure of oxygen and of the nitrogen oxides. The oxidized nitrogen oxides are subsequently scrubbed out by means of aqueous ammonia.

However, the pressure scrub described in DE 10 2008 062 496 produces a highly concentrated wastewater stream having a considerable nitrogen burden.

In the light of this background, it is an object of the present invention to provide means and processes which make removal of nitrogen oxides from flue gas possible in a manner which is simple in terms of apparatus and is economical. This object is achieved by the subjects of the independent claims.

The invention is based on the principle of removing nitrogen oxides ($NO_x$) from an offgas stream by scrubbing with a basic scrubbing medium under superatmospheric pressure and decomposing resulting ammonia nitrite at high temperatures and elevated pressure to form elemental nitrogen.

According to a first aspect of the invention, a process for the removal of NO and $NO_2$ from an oxygen-containing gas stream is provided. The gas stream is brought into contact with an ammonia-containing scrubbing solution in a scrubbing step, as a result of which NO present in the gas stream is oxidized to $NO_2$ at at least 2 bar and temperatures of from 15° C. to 60° C. by the oxygen present and the resulting $NO_2$ is converted into ammonium nitrite by the ammonia-containing scrubbing solution. In a subsequent decomposition step, ammonium nitrite is thermally decomposed into elemental nitrogen and water, with the decomposition step being carried out at a pressure of from 2 to 40 bar and at temperatures of from 121° C. to 190° C.

Carrying out the scrubbing step at pressures of at least 2 bar and temperatures of from 15° C. to 60° C. makes a high nitrite selectivity of the reaction possible, so that ammonium nitrite is preferentially formed. In order to achieve a high degree of decomposition of ammonium nitrite, the decomposition step can be carried out at pH values in the range from 3 to 4. However, this is achieved only by addition of acids before the thermal decomposition. If the regenerated scrubbing solution is subsequently to be reused in the scrubbing step, it has to be rendered alkaline before introduction of ammonia. This in turn results in a high ammonia consumption. As an alternative, the scrub can be operated at low pH values, but this leads to a rapid decrease in the scrubbing performance and the nitrite selectivity. However, it has surprisingly been found that effective nitrite decomposition can be achieved by use of high temperatures and pressures in the decomposition step.

The gas stream is preferably the offgas stream of an oxyfuel plant, but other industrial processes in which $NO_x$-containing offgases are formed and have to be purified are also possible. Particular preference is given to an oxygen content of at least 3% in the offgas stream. The gas stream thus contains not only oxygen and the $NO_x$ contamination to be separated off but also at least carbon dioxide and possibly nitrogen, further constituents of air and combustion products. The scrubbing solutions described here can contain not only the materials mentioned but also further materials. A person skilled in the art will recognize that the word "contains" is thus not used in an exclusive sense here.

In a preferred embodiment of the invention, the decomposition step is carried out at temperatures of from 121° to 170° C., more preferably from 140° C. to 160° C., most preferably at 150° C., with the temperature 150° C. encompassing, for the purposes of the invention, a temperature range from 147° C. to 153° C.

In a further preferred embodiment of the invention, the decomposition step is carried out at a pressure of from 7 to 15 bar.

In a further preferred embodiment, the ammonia-containing scrubbing solution is fed to the scrubbing step after the decomposition step. The scrubbing solution is regenerated by the removal of ammonia nitrite from the scrubbing solution and can be reused in the scrubbing step.

Further preference is given to an embodiment of the invention in which the scrubbing step comprises a scrubbing circuit of the scrubbing solution and scrubbing solution is continuously taken off from this scrubbing circuit. The scrubbing solution is subsequently regenerated and returned to the scrubbing circuit. Ammonium nitrate is formed as by-product during the process and accumulates in the scrubbing solution during the course of the process. Ammonium nitrate additionally serves as catalyst for the thermal decomposition of ammonium nitrite. After a particular ammonium nitrate concentration has been reached, the enriched scrubbing solution can be taken from the scrubbing circuit and ammonium nitrate can be used further, for example, for the production of fertilizer.

In a further preferred embodiment of the invention, heat is introduced into the ammonia-containing scrubbing solution before the decomposition step and heat is removed from the ammonia-containing scrubbing solution after the decomposition step. The thermal decomposition of nitrite is an exothermic reaction. The heat of reaction evolved can be transferred from the regenerated, hot scrubbing solution to the cooler unregenerated scrubbing solution. This serves firstly to maintain the decomposition temperature in the decomposition step and secondly to cool the regenerated scrubbing solution since the regenerated scrubbing solution is recirculated to the scrubbing step and the scrubbing step is carried out at lower temperatures than the decomposition step.

In a further preferred embodiment of the invention, the ammonia-containing scrubbing solution has a pH of from 5 to 7, more preferably from 6.0 to 6.5.

According to a second aspect of the invention, a plant for the removal NO and $NO_2$ from an oxygen-containing gas stream is provided. Such a plant comprises a gas scrubber 1, a decomposition reactor 2 connected thereto and means of regulating the temperature of the gas scrubber 1 and of the decomposition reactor 2, where the gas scrubber 1 and the decomposition reactor 2 are suitable for operation at from 2 to 40 bar, preferably from 7 to 15 bar, and can be operated at different temperatures. The gas scrubber 1 can be a countercurrent column in which the inflowing gas comes into contact with liquid flowing in the opposite direction in a contact zone. Means of regulating the temperature can be heat exchangers, heating or cooling devices.

This plant configuration allows the reaction of the NO present in the unpurified offgas stream with the oxygen present and the thermal decomposition of ammonia nitrite at different temperatures, where both reactions are operated under a superatmospheric pressure of at least 2 bar, preferably from 7 to 15 bar.

The parallel configuration of scrubber and regeneration vessel of the plant of the invention has similarities to amine scrubbing plants known from the prior art. However, in the plant according to the invention, the scrub and the regeneration are operated at different temperatures and under superatmospheric pressure, in contrast to amine scrubs known from the prior art (DE 10 2008 025 224) in which the regeneration of the acidic gas scrub takes place after depressurization in order to reduce the solubility of the gases and thus make regeneration possible. Conveying the scrubbing medium of the amine scrubs back into the scrub requires pumps which can overcome the pressure difference.

In a preferred embodiment of the invention, the gas scrubber 1 is integrated into a scrubbing plant circuit comprising the gas scrubber 1, a flue gas feed line 11 leading to the gas scrubber, a contact zone 17 located downstream in the direction of gas flow of the flue gas feed line 11, a flue gas discharge line 12 arranged downstream in the direction of gas flow of the contact zone 17, a liquid discharge line 13 leading from the gas scrubber 1, a liquid feed line 14 entering the gas scrubber 1 downstream in the direction of gas flow of the contact zone 17, an ammonia feed line 15 leading into the liquid feed line 14 and a water feed line 16 leading into the liquid feed line 14. The contact zone 17 is configured so that very intimate exchange between offgas stream and scrubbing solution takes place. Furthermore, the decomposition reactor 2 is integrated into a decomposition plant circuit comprising the decomposition reactor 2, a decomposition feed line 21 leading from the liquid discharge line 13 to the decomposition reactor 2, a decomposition discharge line 22 leading away from the decomposition reactor 2 and a gas discharge line 26 leading from the decomposition reactor 2. The gas discharge line 26 leads back into the gas scrubber 1. The elemental nitrogen formed in the decomposition reaction can in this way be discharged in a simple manner with the purified flue gas.

In a preferred embodiment of the invention, the gas scrubber 1 and the decomposition reactor 2 can be operated at essentially the same pressures. For the purposes of the invention, essentially the same pressures are pressures which differ from one another by not more than 0.5 bar, more preferably not more than 0.4 bar, 0.3 bar, 0.2 and most preferably not more than 0.1 bar.

In a further preferred embodiment, the circulation pump 19 serves to overcome the static height for recirculation of the scrubbing solution into the gas scrubber 1. The pressure difference of about 2-4 bar associated with the static height is completely sufficient to convey at least part of the scrubbing solution via the decomposition feed line 21 into the decomposition reactor 2. It is necessary to compensate for the pressure drop over the heat exchanger 24, which is normally in the order of 50-150 mbar. The decomposition reactor 2 is connected via a plurality of lines to the scrubber 1, firstly via the gas discharge line 26 at the top and the decomposition feed line 21 and the decomposition discharge line 22 at the bottom. In order to guarantee the flow of liquid from the decomposition reactor 2 into the decomposition discharge line 22, a pressure regulating valve 27 is installed in the gas discharge line 26. This pressure regulating valve 27 ensures a somewhat higher pressure in the decomposition reactor 2 compared to the scrub 1, since the liquid would otherwise not be able to be conveyed via the decomposition discharge line 22. This overpressure is in the region of about 100 mbar. To guarantee better regulation, this overpressure in the decomposition reactor 2 is, in an even more preferred embodiment, increased to about 200-500 mbar. As long as the flow into the decomposition reactor 2 can be guaranteed, the pressure in the decomposition can also be increased still further and can thus amount to a difference of 1 bar and above.

In a further preferred embodiment of the invention, a start-up heating device 25 is arranged within the decomposition plant circuit. The start-up heating device 25 serves to initiate the decomposition reaction of ammonia nitrite. The start-up heating device 25 can be integrated into the decomposition feed line 21, the decomposition discharge line 22 or the decomposition reactor 2.

Further preference is given to an embodiment of the invention in which the decomposition line 22 leads back into the gas scrubber 2. The scrubbing solution which has been regenerated by removal of nitrite can in this way be fed back into the scrubbing plant circuit.

In a further preferred embodiment of the invention, the decomposition feed line 21 and the decomposition discharge line 22 are integrated into a heat exchanger 24. The heat of reaction evolved in the exothermic reaction can in this way be transferred from the hot regenerated scrubbing solution to the cooler unregenerated scrubbing solution. The transfer of the heat serves firstly to maintain the decomposition temperature and secondly the regenerated scrubbing solution is cooled before entering the scrubbing circuit.

In a further embodiment of the invention, the heat exchanger 24 is a cross heat exchanger. In a further preferred embodiment of the second aspect of the invention, the plant is integrated into a compressive stage for $CO_2$ purification.

EXAMPLES

Figure 1:
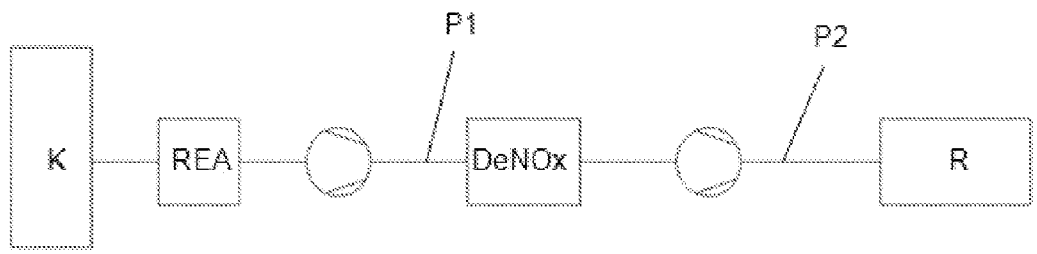
FIG. 1 shows a plant scheme for $CO_2$ purification with integration of the process of the invention.

FIG. 1 shows the integration of the process of the invention into the compressor stage of a $CO_2$ purification. The oxidation of NO is induced by the increase in pressure brought about by the compressor stage. Here, a pressure range from 7 bar to 15 bar is preferred in order to ensure a high nitrite selectivity in the reaction.

Figure 2:
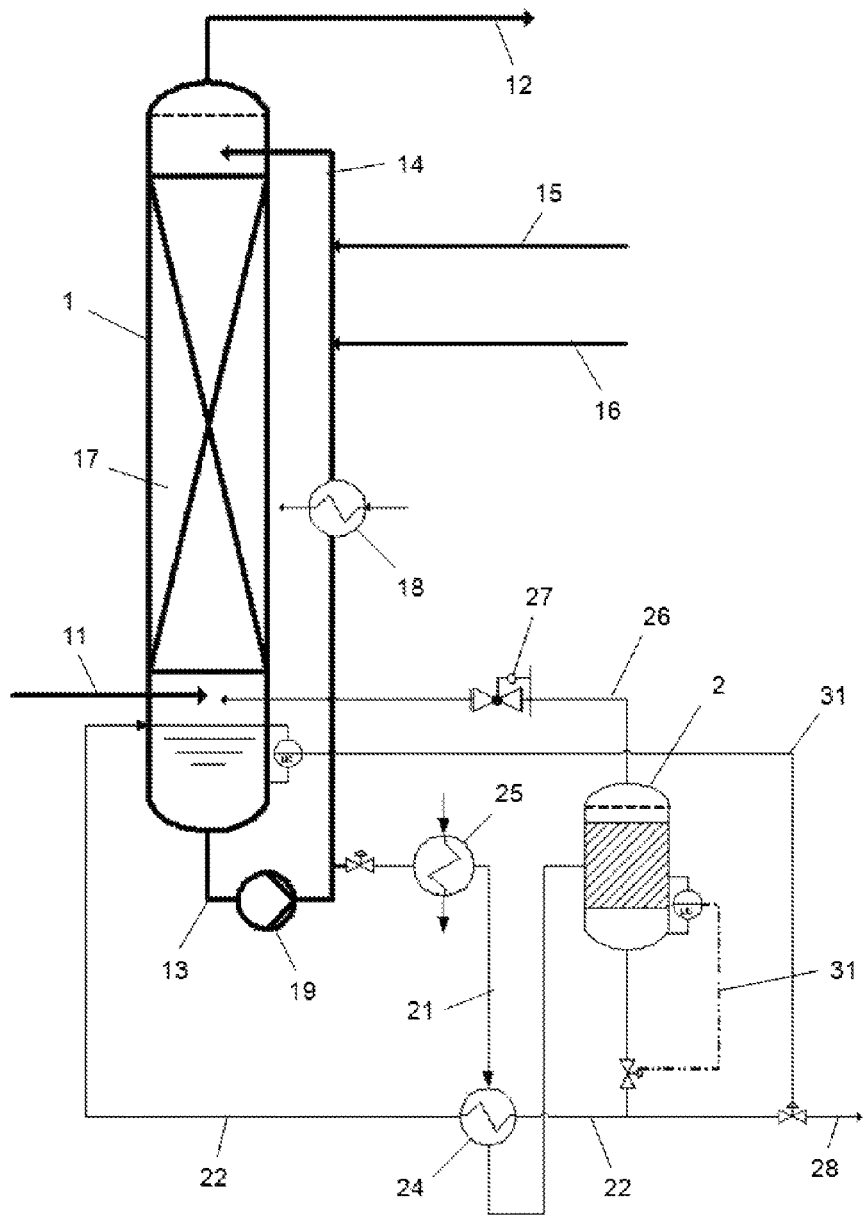
FIG. 2 shows a preferred plant and process embodiment of the invention.

FIG. 2 shows a preferred plant and process embodiment of the invention. Flue gas is fed via a gas feed line 12 into the gas scrubber 1. Due to an elevated pressure of preferably from 7 to 15 bar, the oxidation of NO to $NO_2$ occurs spontaneously and the $NO_2$ is scrubbed out as ammonium nitrite by means of an ammonia-containing solution. Part of the scrubbing solution is passed through a reactor 2 for decomposition of nitrite.

accumulates in the scrubbing medium and additionally serves as decomposition catalyst for the ammonium nitrite.

The expected compositions of the gas and liquid streams in the simulation are shown in Table 1 below.

TABLE 1

| Name of stream | Flue gas | Scrubber wastewater | Discharge | Ammonia feed | Water feed |
|---|---|---|---|---|---|
| Conditions | | | | | |
| Temperature [° C.] | 38 | 37.9 | 142 | 25 | 25 |
| Pressure [bar] | 11.5 | 12.5 | 11.5 | 11.5 | 11.5 |
| Molar flow [$Nm^3/h$] | 1 200 000 | 2670 | 346 | 297 | 0 |
| Mass flow [t/h] | 222 | 2.49 | 0.31 | 0.235 | 0 |
| pH | | 6.43 | 6.4 | 12.5 | 6.995 |
| Composition (mole fraction) | | | | | |
| $H_2O$ | 0.005599 | 0.8394478 | 0.893636 | 0.739313 | 1 |
| $NH_3$ | 0 | 0.078891 | 0.057851 | 0.260687 | 0 |
| $CO_2$ | 0.773009 | 0.014865 | 0.001071 | 0 | 0 |
| $N_2$ | 0.146839 | 0.000013 | 0.00004 | 0 | 0 |
| $O_2$ | 0.045098 | 0.000007 | 0 | 0 | 0 |
| Ar | 0.028462 | 0.000005 | 0 | 0 | 0 |
| NOx | 0.0006 | 0 | 0 | 0 | 0 |
| CO | 0.000393 | 0 | 0 | 0 | 0 |
| $HNO_3$ | 0 | 0.040654 | 0.042012 | 0 | 0 |
| $HNO_2$ | 0 | 0.026086 | 0.005389 | 0 | 0 |

There, ammonium nitrite is reacted to form elemental nitrogen at temperatures in the range from 121° C. to 190° C., preferably from 140° C. to 160° C. The decomposition is strongly exothermic, so that energy supplied by a start-up heating device 25 only has to be employed for initiation of the decomposition. The decomposition then maintains itself. The hot, regenerated scrubbing solution in the decomposition discharge line 22 can be partly cooled against the inflowing stream in the decomposition feed line 21 within a heat exchanger 24 before entering the reactor and thus additionally contributes to maintenance of the decomposition temperature. Salts such as ammonium nitrate formed as by-product accumulate. The reaction gases formed in the decomposition of ammonium nitrite are recirculated via a gas line 26 to the scrub. The regenerated scrubbing solution is returned via the decomposition discharge line 22 likewise to the gas scrubber 1. The pH of the scrubbing solution is adjusted by means of an ammonia feed line 15 and a water feed line 16. Excess scrubbing solution is discharged via the liquid discharge line 28 of the regeneration reactor 2.

Figure 3:
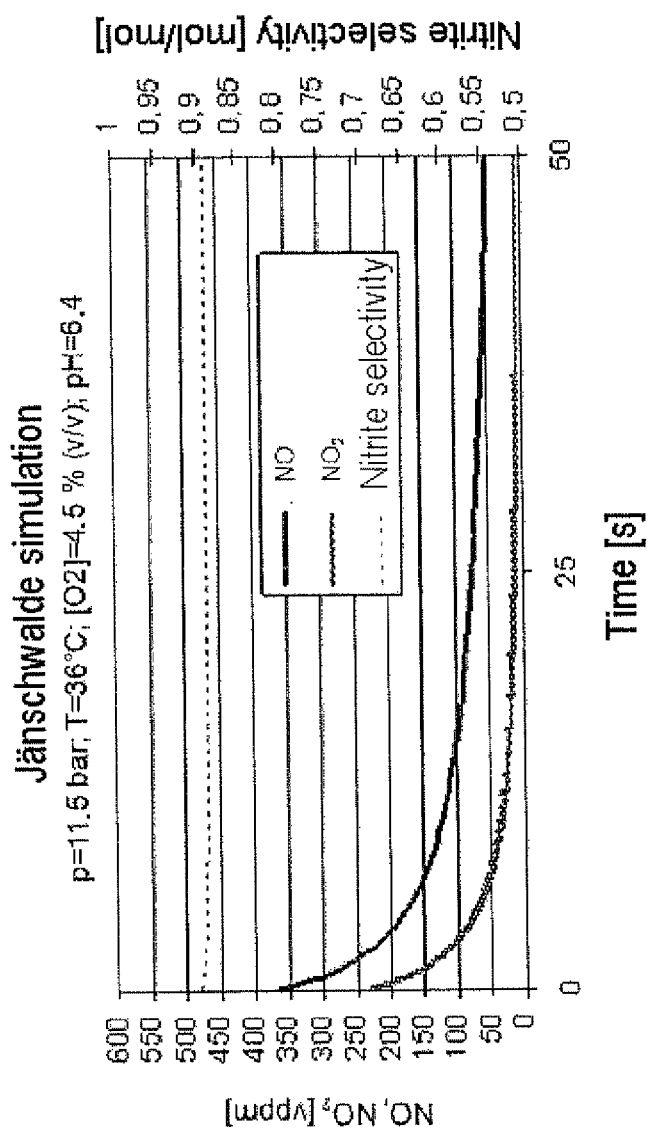
FIG. 3 shows values obtained for nitrogen oxide concentrations in the offgas stream which are obtained in a simulation of the process of the invention.
Figure 4:
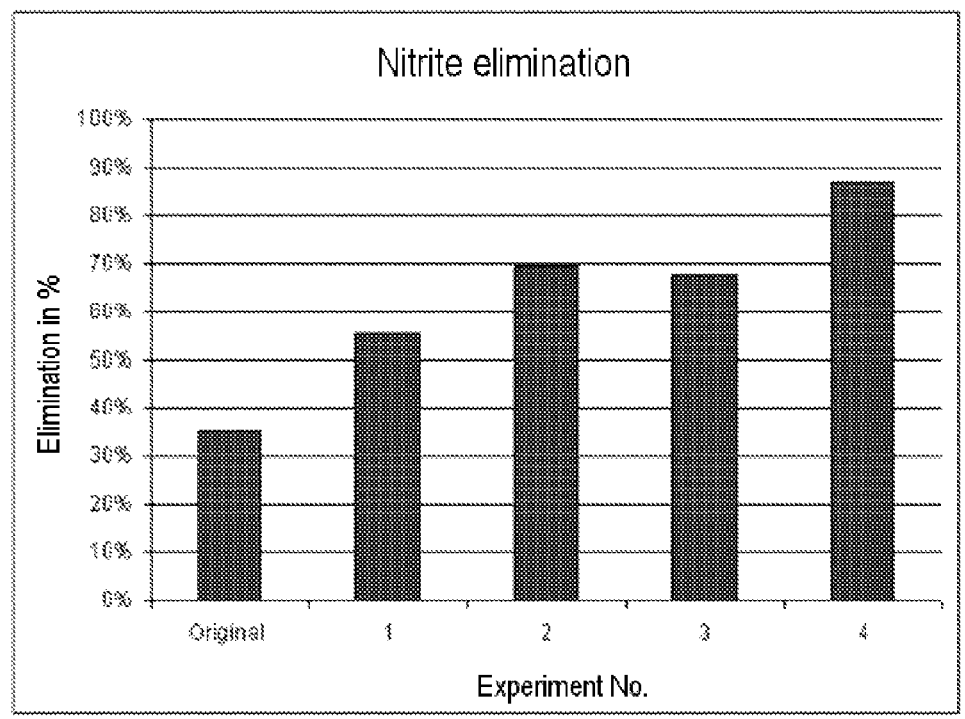
FIG. 4 shows the decomposition of nitrite at various pH values and temperatures.

FIG. 3 shows the result of a simulation of the process of the invention in the purification of flue gas from an oxyfuel power station. The power station produces 120 000 standard $m^3/h$ of flue gas (standard $m^3$ is standard cubic meters, i.e. the volume indicated at STP) having an oxygen content of 4.5% (v/v) and a nitrogen oxide content of about 600 vppm at 36° C. and 11.5 bar. When the flue gas enters the scrub, an NO content of about 350 vppm and an $NO_2$ content of about 250 vppm are expected. A decrease of over 90% in the concentration of the nitrogen oxides is to be expected within a few seconds. A scrubber having a diameter of 3-3.5 m and a height of 25-30 m is required for this. The nitrite selectivity of the process is about 90%. Part of the scrubbing medium (about 1.5-2.5 $m^3/h$) is discharged into a reactor which has a volume of about 2-3 $m^3$ and in which ammonium nitrite is reacted to form elemental nitrogen with an effectiveness of over 90%. Depending on the reaction temperature, ammonium nitrite values of less than 5 g/l in the scrubbing solution after decomposition can be achieved. The by-product ammonium nitrate FIG. 4 shows the influence of the temperature and the pH on the efficiency of nitrite elimination. A scrubbing medium composition corresponding to a scrubbing medium after the scrubbing step of the process of the invention was produced from an ammonia-containing scrubbing solution having a pH of 6.4 by addition of ammonium nitrite and ammonium nitrate at 30° C. (Table 2).

TABLE 2

Sample composition before thermal nitrite decomposition

| Experiment | No. | Original | 1 | 2 | 3 | 4 |
|---|---|---|---|---|---|---|
| Volume | ml | 200 | 204 | 202 | 203 | 200 |
| $NO_2^-$ | g/l | 37 | 36 | 33 | 34 | 35 |
| $NO_3^-$ | g/l | 36 | 41 | 101 | 108 | 112 |
| $NH_4^+$ | g/l | 37 | 37 | 54 | 55 | 56.5 |
| pH | [—] | 8 | 7.5 | 7.8 | 7.6 | 7.97 |
| Conductivity | mS/cm | 168 | 175 | 241 | 253 | 240 |

The decomposition of ammonium nitrite was subsequently carried out at a pressure of 10 bar and various temperatures. Table 3 shows the result after the decomposition.

TABLE 3

Sample composition after the thermal nitrite decomposition

| Experiment | No. | Original | 1 | 2 | 3 | 4 |
|---|---|---|---|---|---|---|
| max. Temperature | ° C. | 130 | 130 | 130 | 130 | 150 |
| Volume | ml | 181 | 197 | 191 | 190 | 188.5 |
| $NO_2^-$ | g/l | 24 | 16 | 10 | 11 | 4.6 |
| $NO_3^-$ | g/l | 34 | 37 | 84 | 108 | 113 |
| $NH_4^+$ | g/l | 29 | 27 | 42 | 44 | 44.4 |
| pH | [—] | 9.6 | 9.6 | 9.4 | 9.4 | 9.28 |
| Conductivity | mS/cm | 107 | 108 | 183 | 195 | 173 |

The addition of ammonium nitrate promotes the decomposition at 130° C., but a reduction in the pH is necessary to achieve appreciable nitrite elimination (Experiments 1, 2 and 3). When the decomposition is carried out at the original pH and at 150° C., substantially more effective elimination is achieved (Experiment 4).

Figure 5:
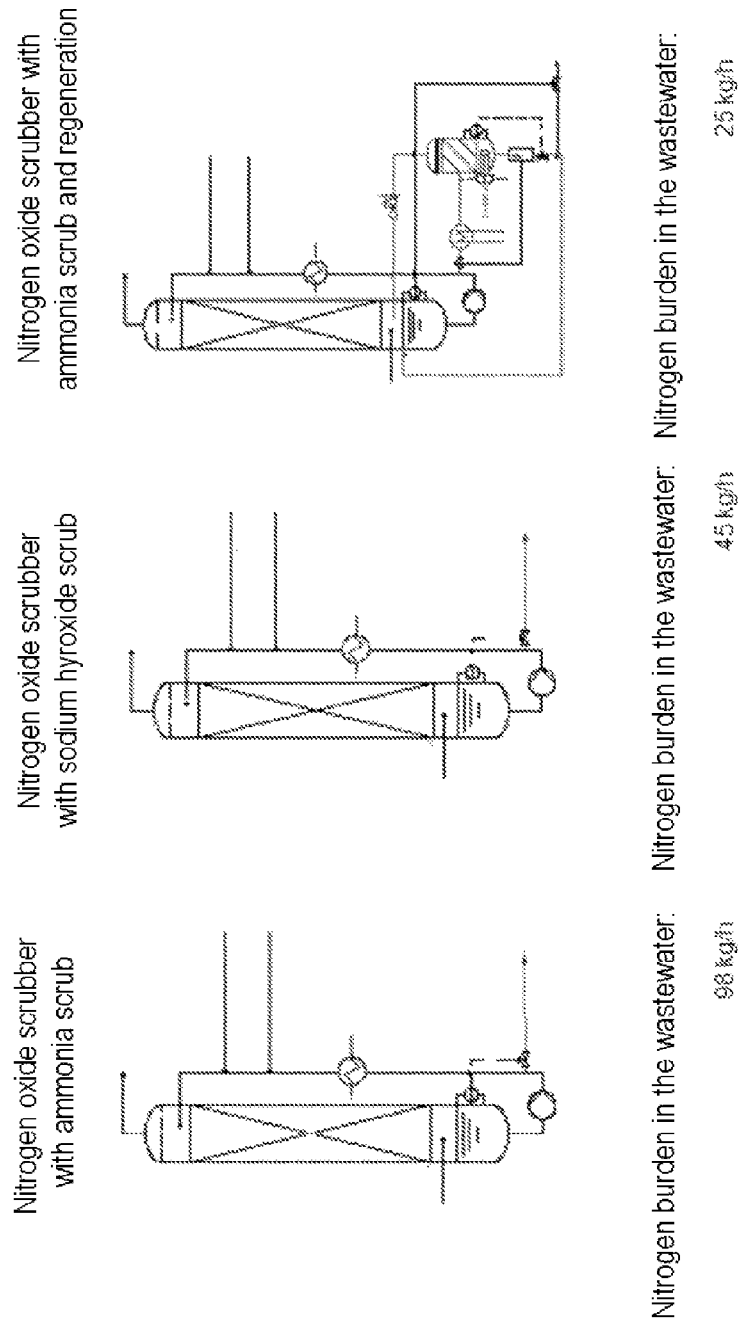
FIG. 5: shows the nitrogen burden in the wastewater from known processes and from the process of the invention.

FIG. 5 schematically shows known plant and process embodiments for scrubbing of nitrogen oxides and a preferred embodiment of the invention. A nitrogen oxide scrubber operated using an ammonia-containing scrubbing solution produces a nitrogen burden of 98 kg per hour of operation in the wastewater. A nitrogen oxide scrubber operated using sodium hydroxide produces a nitrogen burden of 45 kg per hour of operation in the wastewater, while a plant according to the invention produces a nitrogen burden of only 23 kg per hour of operation.

List of reference symbols:

| | | |
|---|---|---|
| 1 | | Gas scrubber |
| | 11 | flue gas feed line |
| | 12 | flue gas discharge line |
| | 13 | liquid discharge line from gas scrubber |
| | 14 | liquid discharge line from gas scrubber |
| | 15 | ammonia feed line |
| | 16 | water feed line |
| | 17 | contact zone |
| | 18 | cooling device |
| | 19 | circulation pump |
| 2 | | decomposition reactor |
| | 21 | decomposition feed line |
| | 22 | decomposition discharge line |
| | 24 | heat exchanger |
| | 25 | start-up heating device |
| | 26 | gas discharge line from apparatus |
| | 27 | pressure regulating valve |
| | 28 | liquid discharge line |
| | 31 | level regulation |
| DeNOx | | Process of nitrogen oxide reduction according to the invention |
| K | | boiler |
| P1 | | flue gas pressure 7-15 bar |
| P2 | | flue gas pressure 20-30 bar |
| R | | $CO_2$ purification |
| REA | | flue gas desulphurization plant |

The invention claimed is:

1. A process for the removal of NO and $NO_2$ from an oxygen-containing gas stream, said process comprising:
    a scrubbing step in which the gas stream is brought into contact with an ammonia-containing scrubbing solution, and NO is oxidized to $NO_2$, by means of the oxygen present, at a pressure of at least 2 bar and temperatures of from 15° C. to 60° C., wherein at least part of the $NO_2$ present in the gas stream is converted by means of the ammonia-containing scrubbing solution into ammonium nitrite; and
    a downstream decomposition step in which the ammonium nitrite present in the scrubbing solution is thermally decomposed into elemental nitrogen and water;
    wherein the decomposition step is carried out at temperatures of from 121° C. to 190° C. and a pressure of from 2 to 40 bar.

2. A process according to claim 1, wherein the decomposition step is carried out at temperatures of from 121° C. to 170° C.

3. A process according to claim 1, wherein the decomposition step is carried out at a pressure of from 7 to 15 bar.

4. A process according to claim 1, wherein the ammonia-containing scrubbing solution is fed back to the scrubbing step after the decomposition step.

5. A process according to claim 1, wherein the scrubbing step comprises a scrubbing circuit of the scrubbing solution, the scrubbing solution is continuously taken off from this scrubbing circuit, the scrubbing solution is regenerated in the decomposition step, and the regenerated scrubbing solution is returned to the scrubbing circuit.

6. A process according to claim 1, wherein heat is introduced into the ammonia-containing scrubbing solution before the decomposition step, and heat is removed from the ammonia-containing scrubbing solution after the decomposition step.

7. A process according to claim 1, wherein the ammonia-containing scrubbing solution has a pH in the range from 5 to 7.

8. A plant for the removal of NO and $NO_2$ from an oxygen-containing gas stream, said plant comprising:
    a gas scrubber 1, a decomposition reactor 2 connected thereto and means of regulating the temperature of the gas scrubber 1 and of the decomposition reactor 2,
    wherein the gas scrubber 1 and the decomposition reactor 2 are suitable for operation at a gauge pressure of from 2 to 40 bar, and
    the gas scrubber 1 and the decomposition reactor 2 can be operated at different temperatures.

9. A plant according to claim 8, wherein
    the gas scrubber 1 is integrated into a scrubbing plant circuit comprising the gas scrubber 1, a flue gas feed line 11 leading to the gas scrubber 1, a contact zone 17 located downstream in the direction of gas flow of the flue gas feed line 11, a flue gas discharge line 12 arranged downstream in the direction of gas flow of the contact zone 17, a liquid discharge line 13 leading from the gas scrubber 1, a liquid feed line 14 leading to the gas scrubber 1, an ammonia feed line 15 leading into the liquid feed line 14 and a water feed line 16 leading into the liquid feed line 14, wherein
    the decomposition reactor 2 is integrated into a decomposition plant circuit comprising the decomposition reactor 2, a decomposition feed line 21 leading from the liquid discharge line 13 to the decomposition reactor 2, a decomposition discharge line 22 leading away from the decomposition reactor 2 and a gas discharge line 26 leading from the decomposition reactor 2 and
    the gas discharge line 26 leads back into the gas scrubber.

10. A plant according to claim 8, wherein the gas scrubber 1 and the decomposition reactor 2 are operated at essentially the same pressures.

11. A plant according to claim 8, wherein a start-up heating device 25 is arranged within the decomposition plant circuit.

12. A plant according to claim 9, wherein the decomposition discharge line 22 leads back into the gas scrubber 1.

13. A plant according to claim 9, wherein the decomposition feed line 21 and the decomposition discharge line 22 are integrated into a heat exchanger 24.

14. A plant according to claim 13, wherein the heat exchanger 24 is a cross-flow heat exchanger.

15. A plant according to claim 8, wherein the plant is integrated into a compression stage for $CO_2$ purification.

16. A process according to claim 1, wherein the decomposition step is carried out at temperatures of from 140° C. to 160° C.

17. A process according to claim 1, wherein ammonia-containing scrubbing solution has a pH in the range from 6 to 6.5.

18. A process according to claim 1, wherein the decomposition step is carried out at a pH value in the range from 3 to 4.

19. A process according to claim 1, wherein the decomposition step is carried out at temperatures of from 147° C. to 153° C.

20. A process according to claim 1, wherein the decomposition step and the scrubbing step are both carried out at a pressure of from 7 to 15 bar.

21. A process according to claim 1, wherein the difference between the operating pressure of the decomposition step and the operating pressure of the scrubbing step is not more than 0.5 bar.

* * * * *